United States Patent
Fushihara et al.

(10) Patent No.: US 9,199,130 B2
(45) Date of Patent: *Dec. 1, 2015

(54) GOLF BALL

(75) Inventors: Kazuhisa Fushihara, Kobe (JP); Kazuhiko Isogawa, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 1008 days.

This patent is subject to a terminal disclaimer.

(21) Appl. No.: 13/179,657

(22) Filed: Jul. 11, 2011

(65) Prior Publication Data

US 2012/0010021 A1    Jan. 12, 2012

(30) Foreign Application Priority Data

Jul. 12, 2010  (JP) ................................ 2010-157812

(51) Int. Cl.
*A63B 37/02*  (2006.01)
*A63B 37/00*  (2006.01)
*C08L 9/00*  (2006.01)

(52) U.S. Cl.
CPC ............. *A63B 37/0063* (2013.01); *C08L 9/00* (2013.01)

(58) Field of Classification Search
None
See application file for complete search history.

(56) References Cited

U.S. PATENT DOCUMENTS

| 4,069,259 | A | | 1/1978 | Cipris et al. | |
|---|---|---|---|---|---|
| 4,570,937 | A | | 2/1986 | Yamada | |
| 5,072,944 | A | | 12/1991 | Nakahara et al. | |
| 5,403,010 | A | * | 4/1995 | Yabuki et al. | 473/372 |
| 5,516,110 | A | | 5/1996 | Yabuki et al. | |
| 5,562,287 | A | * | 10/1996 | Endo et al. | 273/377 |
| 5,803,833 | A | | 9/1998 | Nakamura et al. | |
| 6,755,754 | B2 | | 6/2004 | Kato et al. | |
| 7,273,425 | B2 | | 9/2007 | Higuchi | |
| 2002/0019269 | A1 | | 2/2002 | Watanabe | |
| 2002/0032077 | A1 | * | 3/2002 | Watanabe | 473/370 |
| 2003/0008960 | A1 | * | 1/2003 | Kucera et al. | 524/414 |
| 2003/0032501 | A1 | | 2/2003 | Sakagami et al. | |
| 2003/0050136 | A1 | * | 3/2003 | Mano et al. | 473/371 |
| 2003/0119989 | A1 | * | 6/2003 | Ladd et al. | 525/193 |

(Continued)

FOREIGN PATENT DOCUMENTS

| JP | 2-264674 A | 10/1990 |
|---|---|---|
| JP | 6-98949 A | 4/1994 |

(Continued)

OTHER PUBLICATIONS

English translation of the Japanese Office Action, dated Nov. 5, 2013, for Patent Application No. 2010-157812.

(Continued)

*Primary Examiner* — John E Simms, Jr.
(74) *Attorney, Agent, or Firm* — Birch Stewart Kolasch & Birch, LLP

(57) ABSTRACT

An object of the present invention is to provide a golf ball traveling a greater distance by improving the properties of the spherical core. The present invention provides a golf ball comprising a spherical core, and at least one cover layer covering the spherical core, wherein the spherical core is formed from a rubber composition containing a base rubber, a co-crosslinking agent, a crosslinking initiator, a filler and a polynuclear aromatic organic sulfur compound or a derivative thereof, and the spherical core has a specific hardness distribution without decreasing hardness from a central point toward a surface of the spherical core in JIS-C hardness.

14 Claims, 15 Drawing Sheets

(56) References Cited

U.S. PATENT DOCUMENTS

| | | | |
|---|---|---|---|
| 2004/0106471 A1* | 6/2004 | Hayashi et al. | 473/371 |
| 2004/0106474 A1* | 6/2004 | Hayashi et al. | 473/371 |
| 2005/0075196 A1 | 4/2005 | Shimizu et al. | |
| 2006/0116220 A1* | 6/2006 | Ohama et al. | 473/371 |
| 2006/0178231 A1* | 8/2006 | Kasashima | 473/371 |
| 2007/0129174 A1 | 6/2007 | Higuchi | |
| 2007/0281801 A1 | 12/2007 | Watanabe et al. | |
| 2007/0281802 A1 | 12/2007 | Watanabe et al. | |
| 2008/0020863 A1* | 1/2008 | Higuchi et al. | 473/370 |
| 2008/0194357 A1* | 8/2008 | Higuchi | 473/373 |
| 2011/0250991 A1* | 10/2011 | Isogawa et al. | 473/377 |
| 2012/0172152 A1* | 7/2012 | Okabe et al. | 473/373 |
| 2013/0172113 A1* | 7/2013 | Isogawa et al. | 473/373 |

FOREIGN PATENT DOCUMENTS

| | | |
|---|---|---|
| JP | 6-154357 A | 6/1994 |
| JP | 7-112036 A | 5/1995 |
| JP | 2000-5342 A | 1/2000 |
| JP | 2002-764 A | 1/2002 |
| JP | 2002-765 A | 1/2002 |
| JP | 2003-33447 A | 2/2003 |
| JP | 2003-320056 A | 11/2003 |
| JP | 2006-218294 A | 8/2006 |
| JP | 2007-152090 A | 6/2007 |
| JP | 2007-319660 A | 12/2007 |
| JP | 2008-194473 A | 8/2008 |
| JP | 2010-22504 A | 2/2010 |
| JP | 2011-217857 A | 11/2011 |

OTHER PUBLICATIONS

Chinese Office Action, dated Nov. 25, 2013, for Chinese Application No. 201110203497.3.

English translation of Japanese Office Action, dated Nov. 22, 2011, for Japanese Application No. 2010-088313.

U.S. Office Action, dated Feb. 28, 2014, for U.S. Appl. No. 13/048,915.

U.S. Office Action, dated Oct. 18, 2013, for U.S. Appl. No. 13/048,915.

* cited by examiner

GOLF BALL

FIELD OF THE INVENTION

The present invention relates to a golf ball, in particular to a golf ball traveling a great distance.

DESCRIPTION OF THE RELATED ART

As a method to improve a flight distance of a golf ball on a driver shot, for example, there are a method of using a high resilience core and a method of using a core with a hardness distribution where hardness is getting high from the central point of the spherical core toward the surface thereof. The former provides an effect of enhancing the initial golf ball speed, and the latter provides an effect of increasing a launch angle and reducing a spin rate. Golf balls with a high launch angle and a low spin rate travel a great distance. Hereinafter, the structure of the core having the above hardness distribution may be referred to as "outer-hard and inner-soft structure".

For example, cores having hardness distributions are disclosed in the following patent publications. Japanese Patent Publication No. H06-154357 A discloses a two-piece golf ball comprising a core formed of a rubber composition containing a base rubber, a co-crosslinking agent, and an organic peroxide, and a cover covering the core, characterized in that: the core has the following hardness distribution according to JIS-C type hardness meter readings:
(1) hardness at center: 58-73
(2) hardness at 5 to 10 mm from center: 65-75
(3) hardness at 15 mm from center: 74-82
(4) surface hardness: 76-84, wherein hardness (2) is generally constant within the above rage, and the relation (1)<(2)<(3)≤(4) is satisfied.

Japanese Patent Publication No. 2008-194473 A and Japanese Patent Publication No. 2010-22504 A disclose a solid golf ball comprising a solid core and a cover layer covering the solid core, wherein the solid core has the following hardness distribution:
Central hardness: 25 to 45;
A part of 5 mm to 10 mm apart from the central point: 39-58;
A part of 15 mm apart from the central point: 36-55;
Surface hardness: 55-75; and
a hardness difference between the surface hardness and the central hardness: 20 to 50.

SUMMARY OF THE INVENTION

Golf ball cores are generally molded by a radical polymerization of the rubber composition containing a high-cis polybutadiene, a co-crosslinking agent such as zinc acrylate, and a crosslinking initiator such as an organic peroxide. It is known that adding a small amount of an organic sulfur compound to the core rubber composition improves the resilience of the golf ball cores. However, it is not clear why the organic sulfur compound improves the resilience. On the other hand, the cores obtained by curing the rubber composition tend to have an outer-hard and inner-soft structure. In order to enhance the degree of the outer-hard and inner-soft structure, a method of using a multi-layered core is adopted. However, the multi-layered core has the following defects. The resilience tends to become low, because of loss of hitting energy at the interfaces of the multi-layered structure. Further, the large deformation at the interfaces of the multi-layered structure generates origin of a crack, and thus the durability becomes low. Moreover, since the additional process for forming a multi-layered structure is required, the process is not economically efficient. The present invention has been made in view of the above circumstances, and an object of the present invention is to provide a golf ball traveling a greater distance by improving the properties of the spherical core.

The present invention that has solved the above problems provides a golf ball comprising a spherical core, and at least one cover layer covering the spherical core, wherein the spherical core is formed from a rubber composition containing a base rubber, a co-crosslinking agent, a crosslinking initiator, a filler and a polynuclear aromatic organic sulfur compound or a derivative thereof, and the spherical core has a hardness distribution that satisfies B<A≤C without decreasing hardness from a central point toward a surface of the spherical core in JIS-C hardness, wherein A=Hardness H5 at a distance of 5 mm from the central point of the spherical core−Central hardness H0 at the central point of the spherical core, B=Hardness H12.5 at a distance of 12.5 mm from the central point of the spherical core−Hardness H5 at a distance of 5 mm from the central point of the spherical core, and C=Surface hardness Hs at the surface of the spherical core−Hardness H12.5 at a distance of 12.5 mm from the central point of the spherical core.

The spherical core of the golf ball of the present invention is formed from a rubber composition containing a base rubber, a co-crosslinking agent, a crosslinking initiator, a filler and a polynuclear aromatic organic sulfur compound or a derivative thereof. Use of the rubber composition containing the polynuclear aromatic organic sulfur compound does not only enhance the resilience of the core (golf ball initial speed), but also provides the core having a high degree of the outer-hard and inner-soft structure. As a result, the golf ball with the high resilience, high launch angle, and low spin rate is obtained, and thus the flying distance on driver shots becomes greater.

According to the present invention, the golf ball traveling a great distance is obtained.

DESCRIPTION OF THE PREFERRED EMBODIMENT

Figure 1:
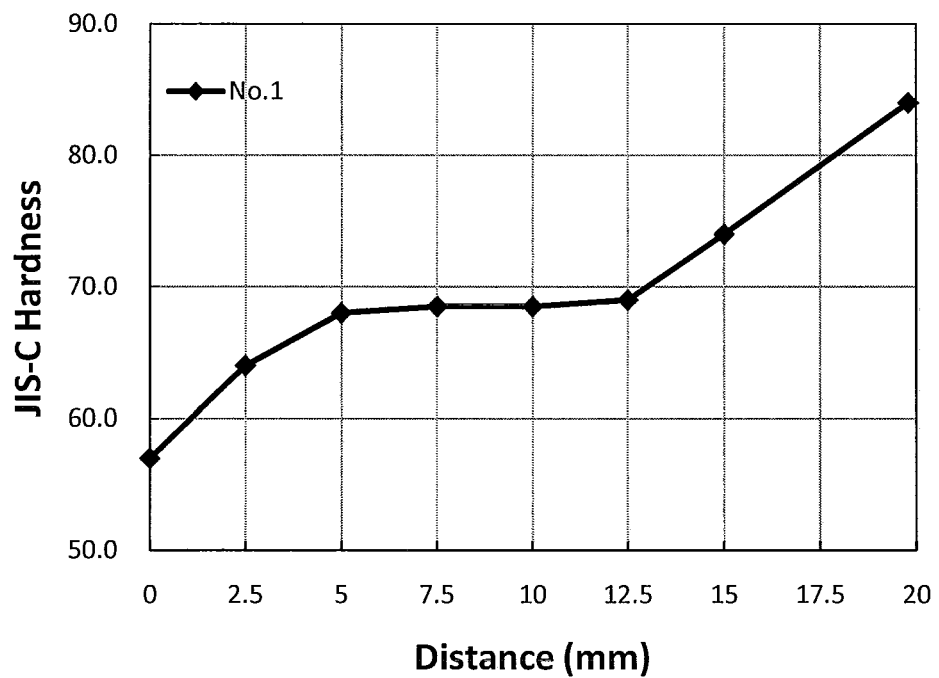
FIG. 1 is a graph showing the hardness distribution of the golf ball No. 1.
Figure 2:
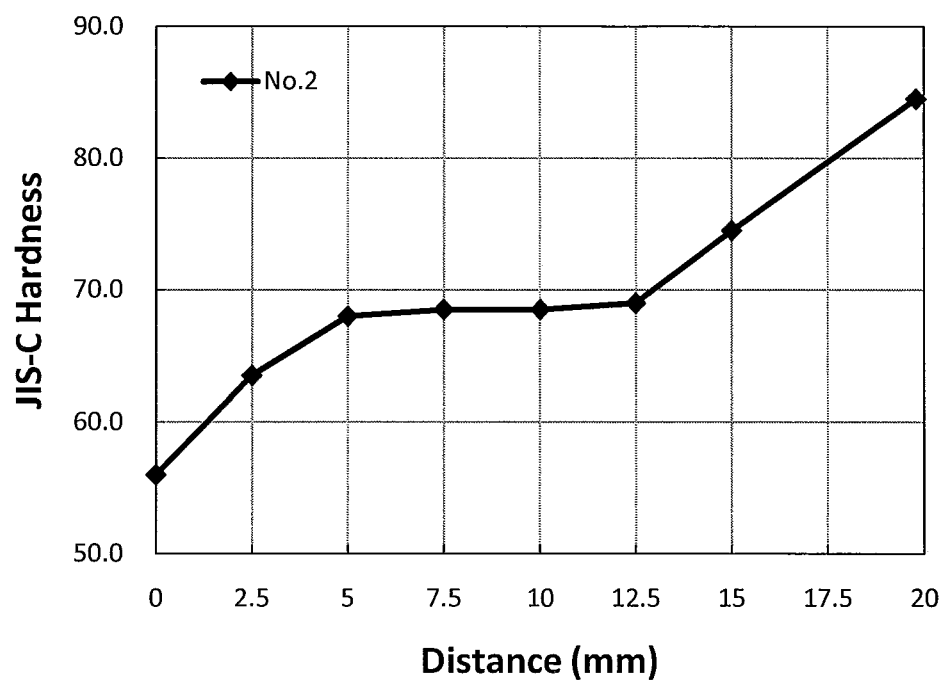
FIG. 2 is a graph showing the hardness distribution of the golf ball No. 2.
Figure 3:
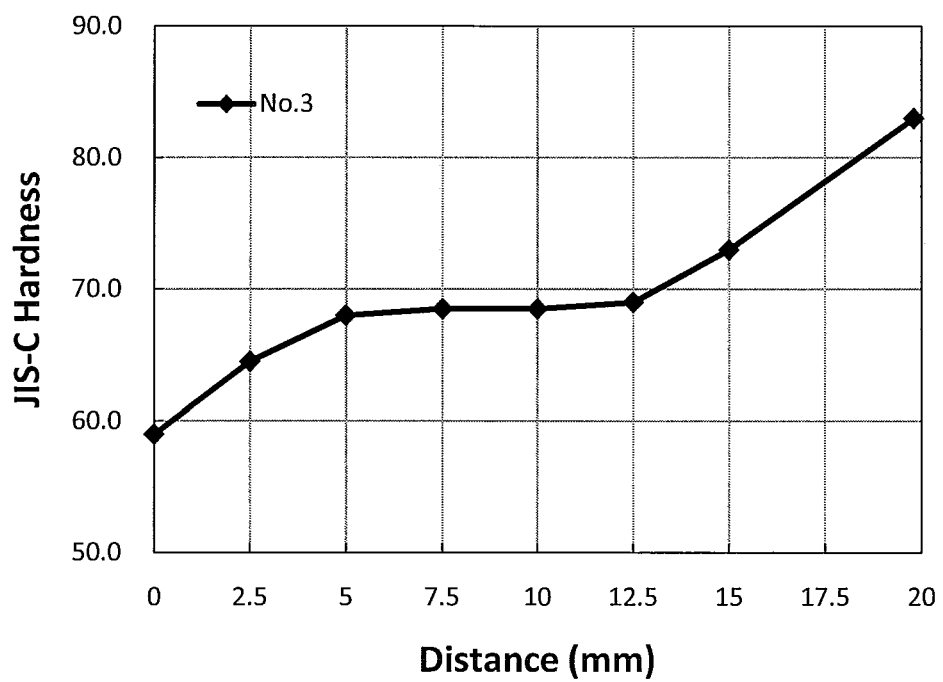
FIG. 3 is a graph showing the hardness distribution of the golf ball No. 3.
Figure 4:
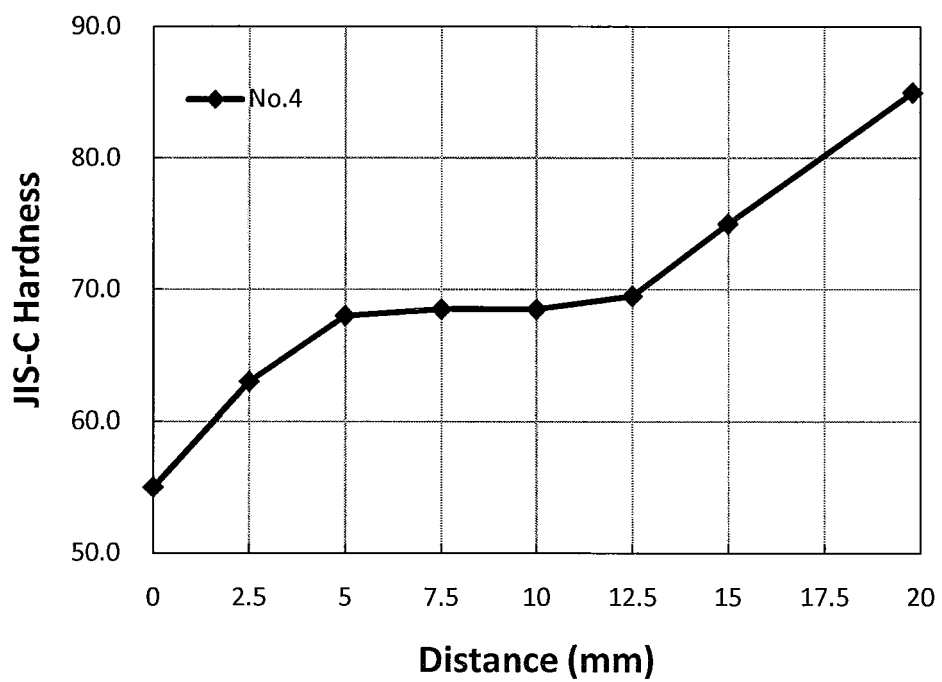
FIG. 4 is a graph showing the hardness distribution of the golf ball No. 4.
Figure 5:
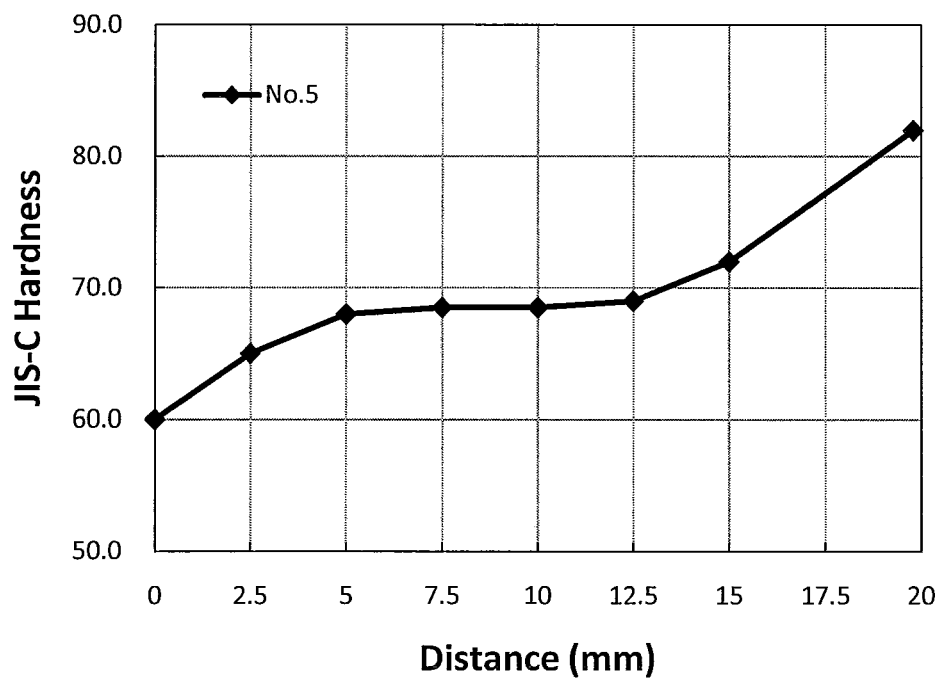
FIG. 5 is a graph showing the hardness distribution of the golf ball No. 5.
Figure 6:
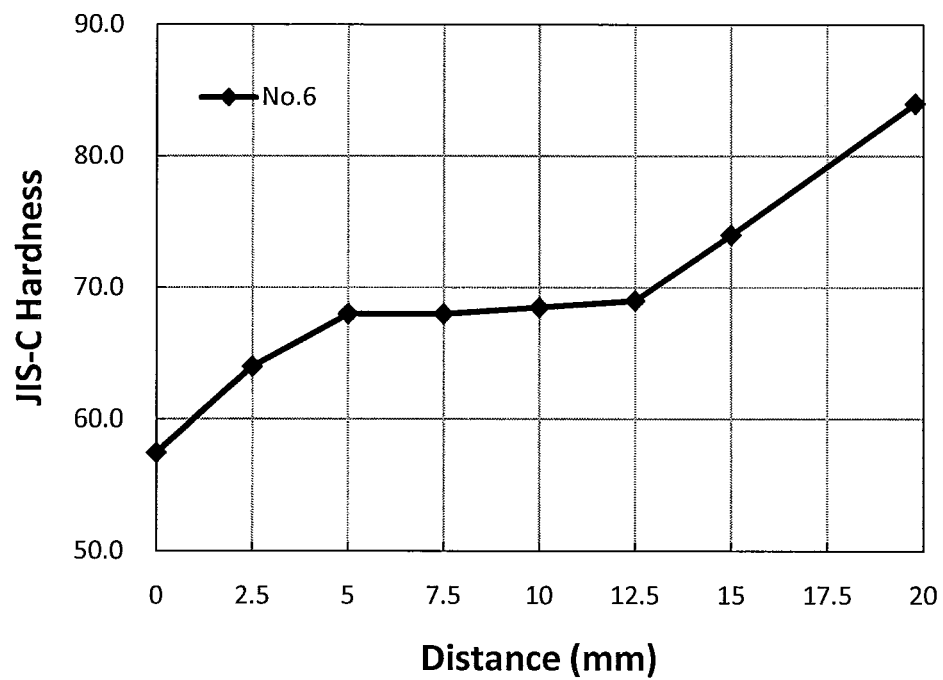
FIG. 6 is a graph showing the hardness distribution of the golf ball No. 6.
Figure 7:
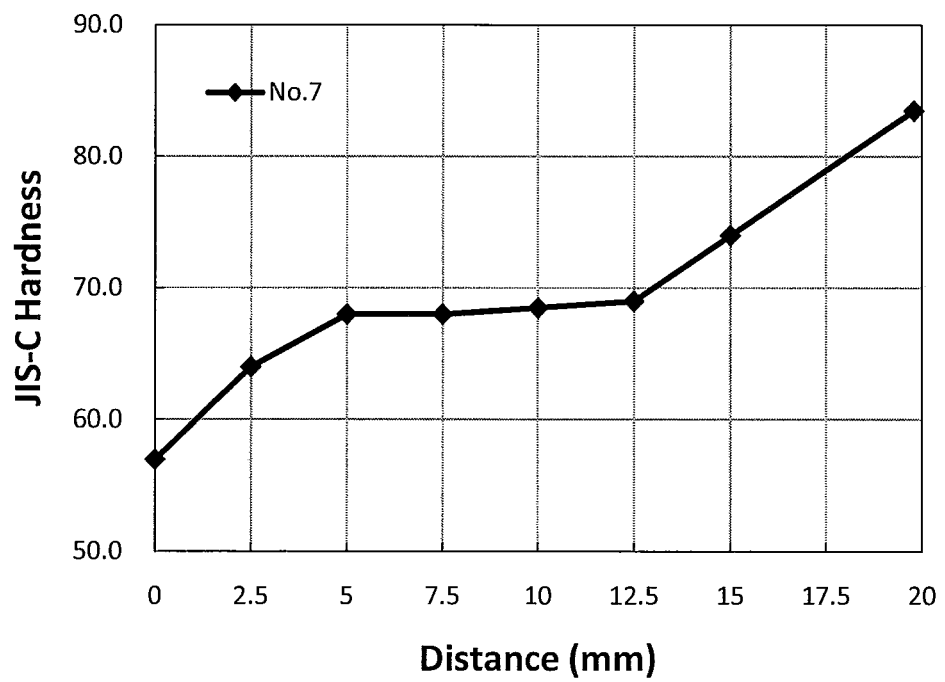
FIG. 7 is a graph showing the hardness distribution of the golf ball No. 7.
Figure 8:
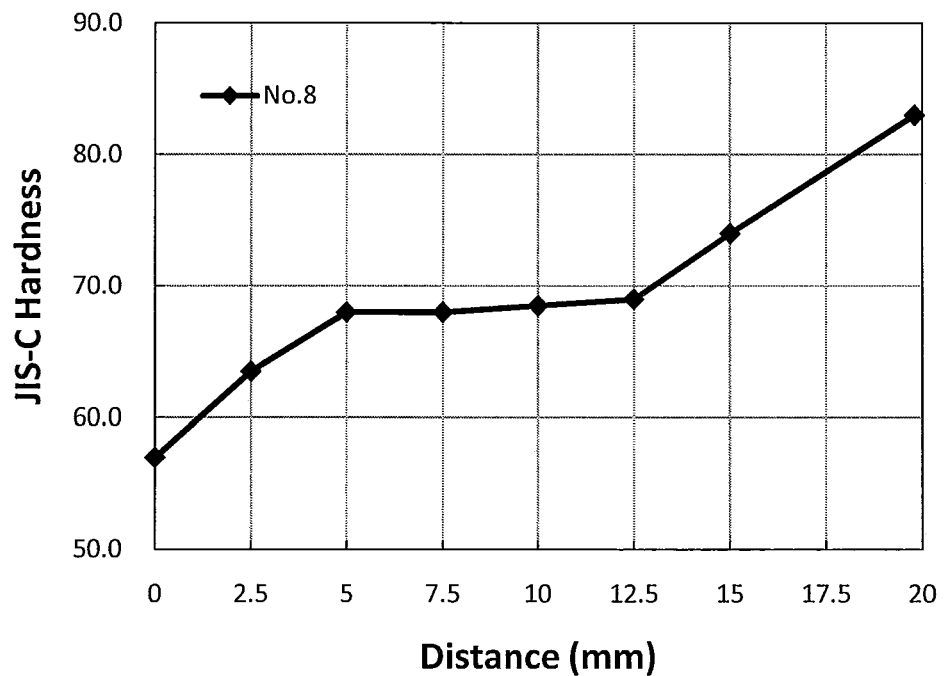
FIG. 8 is a graph showing the hardness distribution of the golf ball No. 8.
Figure 9:
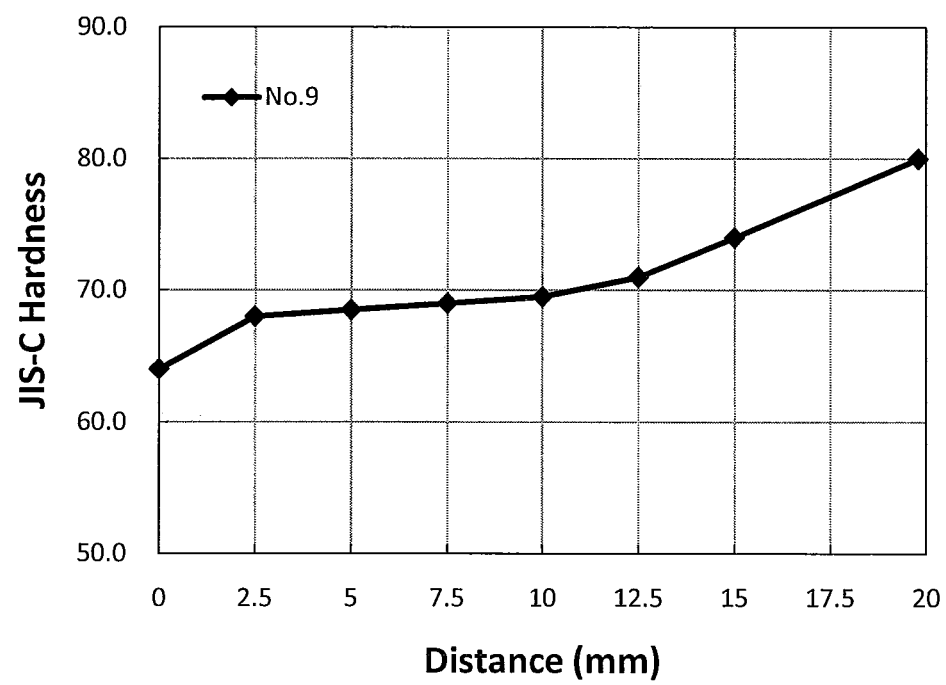
FIG. 9 is a graph showing the hardness distribution of the golf ball No. 9.
Figure 10:
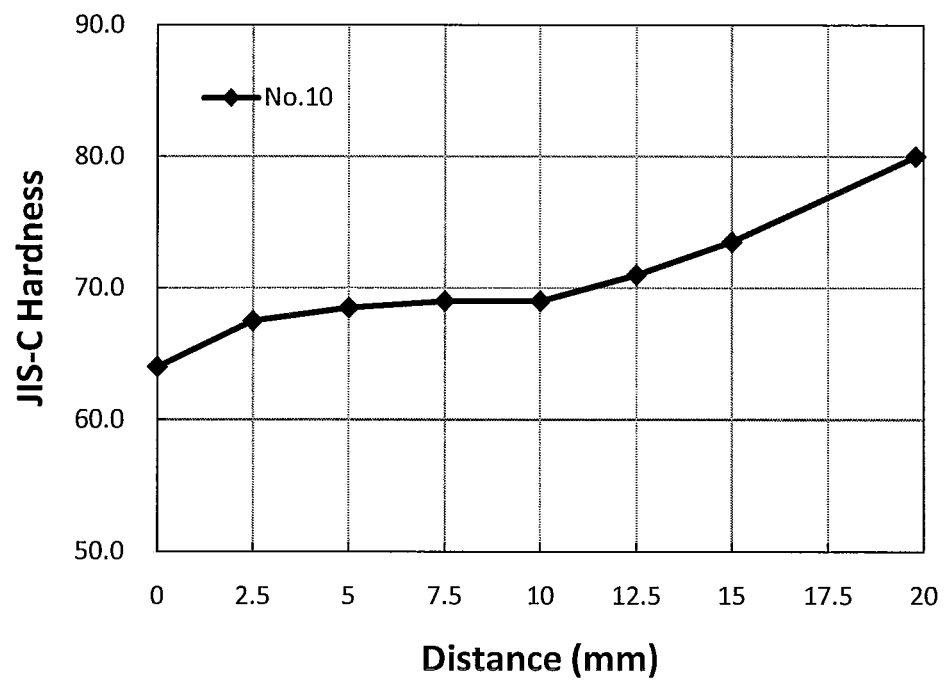
FIG. 10 is a graph showing the hardness distribution of the golf ball No. 10.
Figure 11:
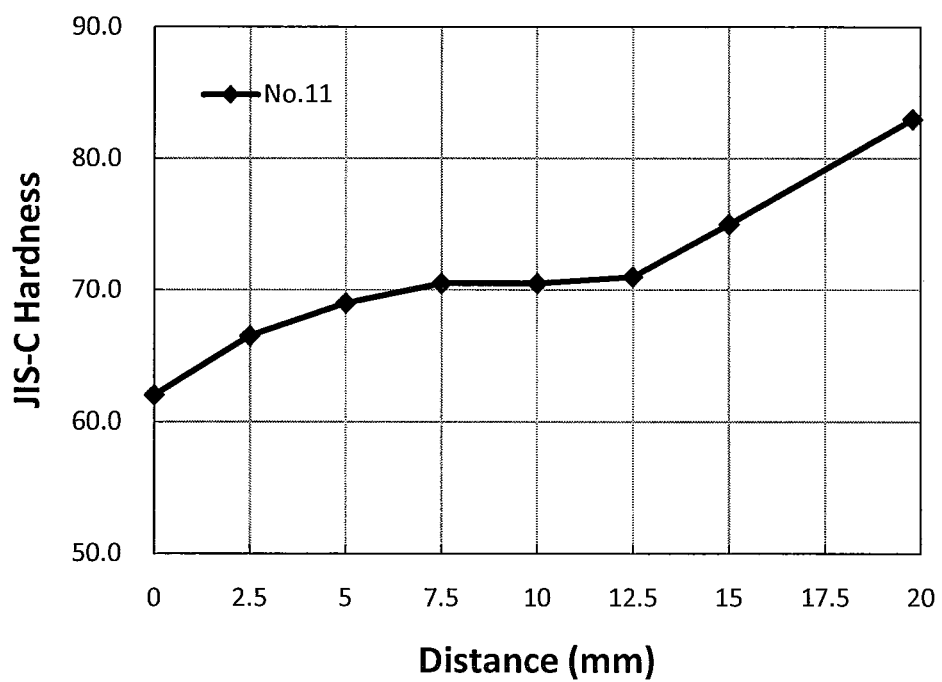
FIG. 11 is a graph showing the hardness distribution of the golf ball No. 11.
Figure 12:
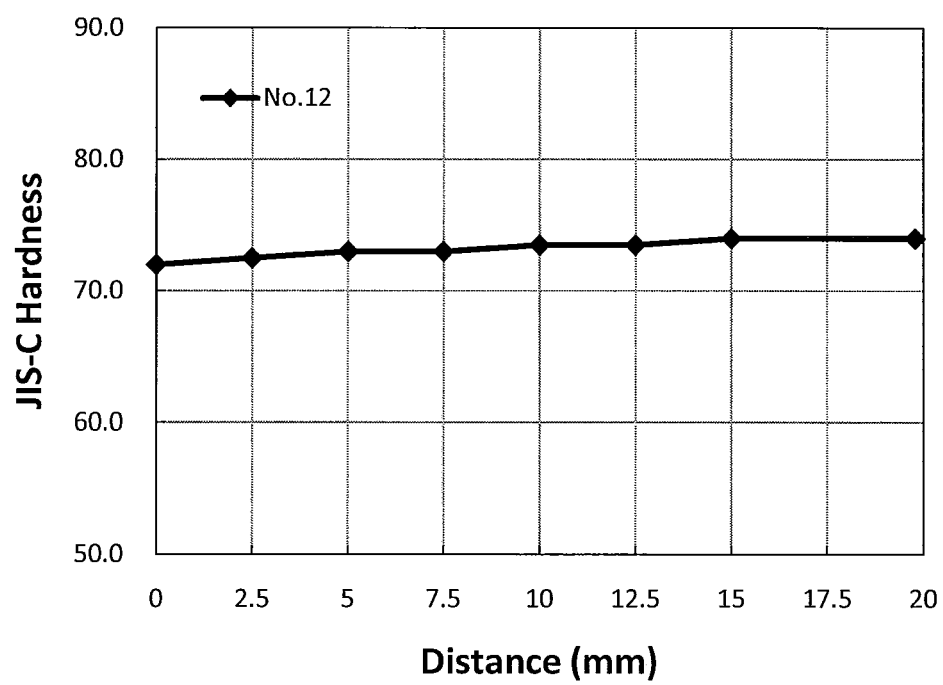
FIG. 12 is a graph showing the hardness distribution of the golf ball No. 12.
Figure 13:
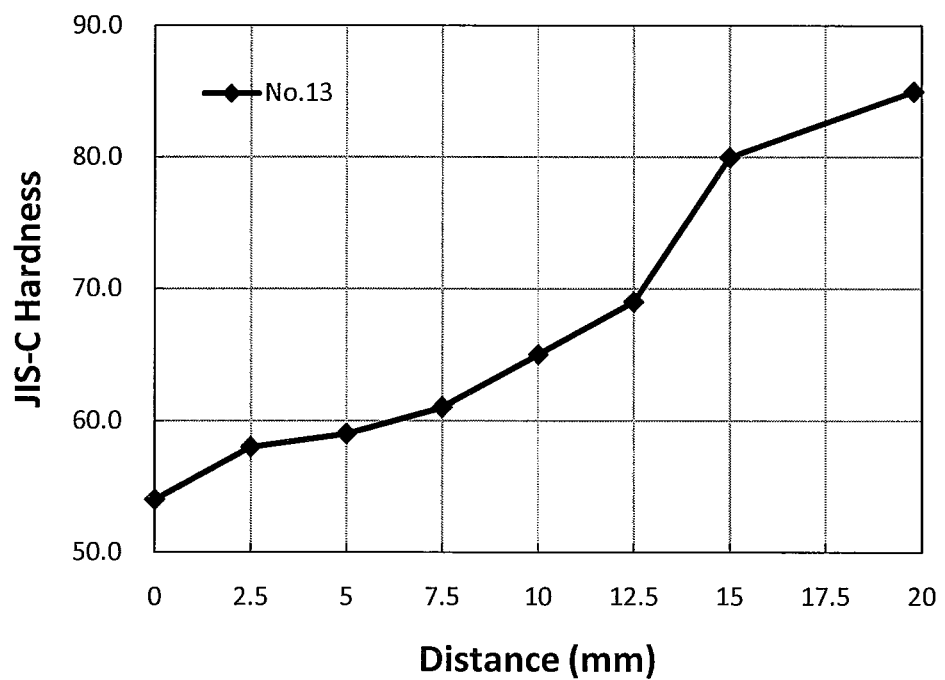
FIG. 13 is a graph showing the hardness distribution of the golf ball No. 13.
Figure 14:
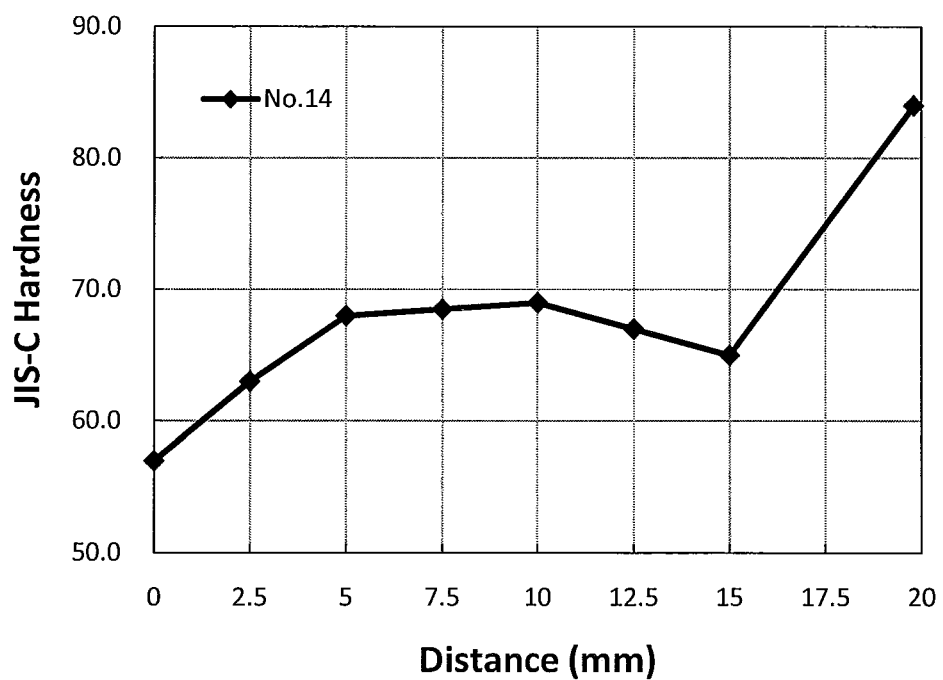
FIG. 14 is a graph showing the hardness distribution of the golf ball No. 14.
Figure 15:
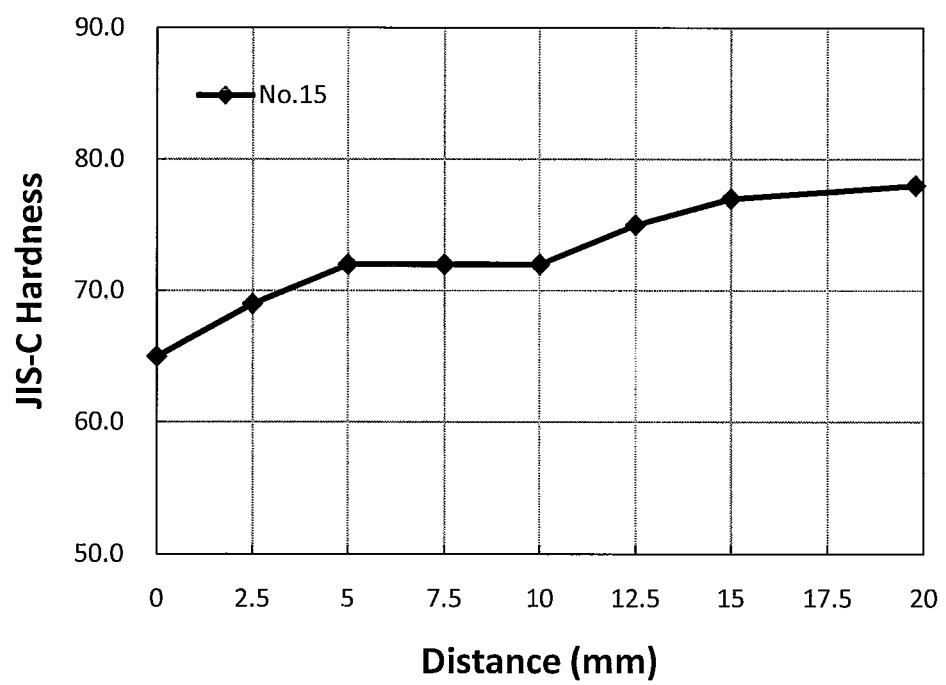
FIG. 15 is a graph showing the hardness distribution of the golf ball No. 15.

The present invention provides a golf ball comprising a spherical core, and at least one cover layer covering the spherical core, wherein the spherical core is formed from a rubber composition containing a base rubber, a co-crosslinking agent, a crosslinking initiator, a filler and a polynuclear aromatic organic sulfur compound or a derivative thereof, and the spherical core has a hardness distribution that satisfies B<A≤C without decreasing hardness from a central point toward a surface of the spherical core in JIS-C hardness, wherein A=Hardness H5 at a distance of 5 mm from the central point of the spherical core—Central hardness H0 at the central point of the spherical core, B=Hardness H12.5 at a distance of 12.5 mm from the central point of the spherical core–Hardness H5 at a distance of 5 mm from the central point of the spherical core, and C=Surface hardness Hs at the surface of the spherical core–Hardness H12.5 at a distance of 12.5 mm from the central point of the spherical core.

The spherical core of the golf ball of the present invention is formed from a rubber composition containing a base rubber, a co-crosslinking agent, a crosslinking initiator, a filler and a polynuclear aromatic organic sulfur compound or a derivative thereof (hereinafter, sometimes may be referred to as "core rubber composition"). First, the polynuclear aromatic organic sulfur compound or the derivative thereof will be explained.

The polynuclear aromatic organic sulfur compound is an organic compound that has a fused ring structure where two or more of aromatic rings shear two atoms respectively, and a functional group derived from a sulfur atom. For example, the polynuclear aromatic organic sulfur compound includes a compound having a naphthalene ring, an anthracene ring, or a phenanthrene ring. The polynuclear aromatic organic sulfur compound preferably has at least one functional group selected from the group consisting of a thiol group, a sulfide group, a disulfide group, a thiocarboxyl group, and a dithiocarboxyl group, more preferably a thiol group as the functional group derived from the sulfur atom. The polynuclear aromatic organic sulfur compound used in the present invention preferably includes thiol derivatives such as naphthalene thiol, anthracene thiol, phenanthrene thiol or the like; sulfide derivatives such as naphthalene sulfide, anthracene sulfide, phenanthrene sulfide or the like; disulfide derivatives such as naphthalene disulfide, anthracene disulfide, phenanthrene disulfide or the like; thiocarboxylic acid derivatives such as naphthalene thiocarboxylic acid, anthracene thiocarboxylic acid, phenanthrene thiocarboxylic acid or the like; and dithiocarboxylic acid derivatives such as naphthalene dithiocarboxylic acid, anthracene dithiocarboxylic acid, phenanthrene dithiocarboxylic acid or the like. The derivatives of the polynuclear aromatic organic sulfur compound include metal salts thereof and the polynuclear aromatic organic sulfur compound substituted with the substituents having a substituent constant of 1.5 or more described layer. The metal salt preferably includes a divalent metal salt, more preferably zinc salt. Use of the zinc salt improves the dispersibility into the rubber composition. The polynuclear aromatic organic sulfur compound or the derivative thereof may be used alone or in combination of at least two of them.

At least one hydrogen of the fused ring of the polynuclear aromatic organic sulfur compound may be substituted with a substituent having a substituent constant of 1.5 or more, more preferably with a substituent having a substituent constant of 1.7 or more, even more preferably with a substituent having a substituent constant of 2.2 or more. If the polynuclear aromatic organic sulfur compound substituted with the substituent having a substituent constant of 1.5 or more is used, the resilience of the golf ball core is enhanced. Herein, the term "substituent constant" in the present invention means a substituent constant in the Hammett's rule in which the influence of a substituent on the reaction rate or equilibrium of a benzene derivative is quantified. However, as is well known, the Hammett's rule applies only to meta- and para-substituted benzene derivatives, but cannot apply to ortho-substituted benzene derivatives. Thus, in the case of ortho-substituted benzene derivatives, the substituent constant means a substituent constant in the Taft equation which is obtained by expanding the Hammett's rule.

The Hammett's rule is represented by the following equation (a):

$$\log(K/K0) = \rho\sigma \tag{a}$$

(wherein K represents the reaction value for a compound which contain a substituent; K0 represents the reaction value for the compound when the substituent is not contained, i.e., when the substituent is a hydrogen atom; p represents the reaction constant; and σ represents the substituent constant).

The reaction constant (ρ) in the above equation (a) depends on the reaction type and the reaction conditions such as temperature and the type of solvent, and is "1.00" in the case of substituted benzoic acid, and "0.49" in the case of substituted phenyl acetic acid.

The substituent constant (a) in the above equation (a) depends only on the type and position of the substituent, and not on the reaction type. The constant is "0.00" when no substituent is present, i.e., when the substituent is a hydrogen atom. The substituent constant has a positive value if the substituent is an electron withdrawing group and has a negative value if the substituent is an electron donating group. Thus, the symbols (plus or minus) and magnitude of the substituent constant indicate a reaction mechanism.

As described above, the Hammett's rule applies only to meta- or para-substituted benzene derivatives, but cannot apply to ortho-substituted benzene derivatives which are susceptible to the influence of steric hindrance or the like. Thus, the Hammett's rule is expanded by introducing such influence of steric hindrance or the like as a positional factor, so as to allow the Hammett's rule to apply to ortho-substituted benzene derivatives, thereby obtaining the Taft equation. The Taft equation is represented by the following equation (b):

$$\log(K/K0) = \rho^*\sigma^* + E_s \tag{b}$$

(wherein K represents the reaction value for a compound which contains a substituent; K0 represents the reaction value for the compound when the substituent is not contained, i.e., when the substituent is a hydrogen atom; ρ* represents the reaction constant; σ* represents the substituent constant, and $E_s$ represents the substituent positional constant). In the above equation (b), the influence of the steric hindrance or the like on ortho-substituted benzene derivatives is introduced as a positional factor, i.e., as the substituent positional constant Es, and the component other than "Es" in "ρσ" of the above equation (a) is represented by "ρ*σ*". In the case that the substituents are present at meta or para position and at ortho position of the benzene ring, the sum of "σ" and "σ*" gives the substituent constant. The substituents having a substituent constant of 1.5 or more include, for example, a chloro group, a bromo group, and a trifluoromethyl group.

In the present invention, the polynuclear aromatic organic sulfur compound preferably includes naphthalene thiol or derivatives thereof. Examples of the naphthalene thiol are 2-naphthalene thiol, 1-naphthalene thiol, 2-chloro-1-naphthalene thiol, 2-bromo-1-naphthalene thiol, 2-fluoro-1-naphthalene thiol, 2-cyano-1-naphthalene thiol, 2-acetyl-1-naphthalene thiol, 1-chloro-2-naphthalene thiol, 1-bromo-2-naphthalene thiol, 1-fluoro-2-naphthalene thiol, 1-cyano-2-naphthalene thiol, and 1-acetyl-2-naphthalene thiol. Preferable examples include 2-naphthalene thiol and zinc salt thereof.

The blending amount of the polynuclear aromatic organic sulfur compound is preferably 0.03 part by mass or more, more preferably 0.1 part by mass or more, even more preferably 0.2 part by mass or more, and is preferably 3.5 parts by mass or less, more preferably 2.0 parts by mass or less, even more preferably 1.0 part by mass or less with respect to 100 parts by mass of the base rubber. If the blending amount of the polynuclear aromatic organic sulfur compound falls within the above range, the spherical core with a desired resilience and hardness distribution is obtained.

As the base rubber for use in the core rubber composition, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is the high cis-polybutadiene having cis-1,4 bond in a proportion of 40% or more, more preferably 70% or more, even more preferably 90% or more in view of its superior resilience property.

The crosslinking initiator is blended in order to crosslink the base rubber component. As the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Among them, dicumyl peroxide is preferably used. The blending amount of the crosslinking initiator is preferably 0.3 part by mass or more, and more preferably 0.4 part by mass or more, and is preferably 5 parts by mass or less, and more preferably 3 parts by mass or less, with respect to 100 parts by mass of the base rubber. If the blending amount of the crosslinking initiator is less than 0.3 part by mass, the spherical core becomes too soft, and thus the golf ball may have the low resilience. If the blending amount of the crosslinking initiator exceeds 5 parts by mass, the amount of the co-crosslinking agent must be increased in order to obtain the appropriate hardness, which tends to cause the insufficient resilience.

The co-crosslinking agent is not particularly limited, as long as it has the action of crosslinking a rubber molecule by graft polymerization to a base rubber molecular chain. For example, an α,β-unsaturated carboxylic acid having 3 to 8 carbon atoms, or a metal salt thereof can be used, and preferable examples thereof include acrylic acid, methacrylic acid, and metal salts thereof. Examples of the metal for forming the metal salt include zinc, magnesium, calcium, aluminum, and sodium. Among them, zinc is preferred. As the co-crosslinking agent, zinc acrylate is preferred.

The blending amount of the co-crosslinking agent is preferably 10 parts by mass or more, more preferably 15 parts by mass or more, even more preferably 20 parts by mass or more, and is preferably 55 parts by mass or less, and more preferably 50 parts by mass or less, even more preferably 48 parts by mass or less with respect to 100 parts by mass of the base rubber. If the blending amount of the co-crosslinking agent is less than 10 parts by mass, the blending amount of the crosslinking initiator must be increased to have an appropriate hardness. Thus, the resilience of the golf ball tends to decrease. On the other hand, if the blending amount of the co-crosslinking agent exceeds 55 parts by mass, the core becomes too hard, and thus the shot feeling of the golf ball may deteriorate.

The filler used for the core rubber composition is mainly blended as a weight adjusting agent in order to adjust the weight of the golf ball obtained as the final product, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and is preferably 30 parts or less, more preferably 20 parts or less based on 100 parts of the base rubber by mass. If the amount of the filler to be blended is less than 0.5 part by mass, it becomes difficult to adjust the weight, while if it is more than 30 parts by mass, the weight ratio of the rubber component becomes small and the resilience tends to be lowered.

As the core rubber composition, an antioxidant or a peptizing agent may be blended appropriately in addition to the base rubber, the crosslinking initiator, the co-crosslinking agent and the filler.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The spherical core of the golf ball of the present invention can be obtained by mixing, kneading the above mentioned rubber composition and molding the rubber composition in the mold. The spherical core can be molded under the conditions of 10 to 60 minutes, temperature of 130° C. to 200° C. and the pressure from 2.9 MPa to 11.8 MPa. Alternatively, the spherical core can be molded under the two-step heating conditions, for example, for 20 to 40 minutes at the temperature of 130° C. to 150° C., and continuously for 5 to 15 minutes at the temperature of 160° C. to 180° C. In the present invention, it is especially important to select the molding condition in order to make the spherical core have a desired hardness distribution.

The spherical core of the present invention has a hardness distribution that satisfies $B<A \leq C$ without decreasing hardness from the central point toward the surface of the spherical core in JIS-C hardness, wherein A=Hardness H5 at a distance of 5 mm from the central point of the spherical core−Central hardness H0 at the central point of the spherical core, B=Hardness H12.5 at a distance of 12.5 mm from the central point of the spherical core−Hardness H5 at a distance of 5 mm from the central point of the spherical core, and C=Surface hardness Hs at the surface of the spherical core−Hardness H12.5 at a distance of 12.5 mm from the central point of the spherical core. If the above hardness distribution is satisfied, the golf ball having a high launch angle and a low spin rate on a driver shot is obtained.

The hardness difference A is the hardness difference (H5-H0) between the hardness H5 at a distance of 5 mm from the central point of the spherical core and the central hardness H0 at the central point of the spherical core. The hardness difference A is preferably 6 or more, more preferably 8 or more, in JIS-C hardness. If the hardness difference A is large, the golf ball traveling a great distance with a high launch angle and a low spin rate is obtained. Further, the hardness difference A is preferably 15 or less in view of facilitating the manufacture of the spherical core.

The hardness difference B is the hardness difference (H12.5–H5) between the hardness H12.5 at a distance of 12.5 mm from the central point of the spherical core and the hardness H5 at a distance of 5 mm from the central point of the spherical core. The hardness in a region at a distance of 5 mm to 12.5 mm from the central point of the spherical core is almost constant or increase very slightly from the central point to the surface. The hardness difference B is preferably 0 or more, more preferably 0.5 or more, and is preferably 4 or less, more preferably 3 or less, even more preferably 1.5 or less in JIS-C hardness.

The hardness difference C is the hardness difference (Hs–H12.5) between the surface hardness Hs at the surface of the spherical core and the hardness H12.5 at a distance of 12.5 mm from the central point of the spherical core. The hardness difference C is preferably 10 or more, more preferably 13 or more, even more preferably 14 or more in JIS-C hardness. If the hardness difference C is large, the golf ball traveling a great distance with a high launch angle and a low spin rate is obtained. Further, the hardness difference C is preferably 20 or less in view of facilitating the manufacture of the spherical core.

The hardness difference D (Hs–H0) between the surface hardness Hs and the central hardness H0 of the spherical core in the golf ball of the present invention is preferably 22 or larger, more preferably 24 or larger, and is preferably 35 or less in JIS-C hardness. If the hardness difference D is large, the golf ball traveling a great distance with a high launch angle and a low spin rate is obtained.

The central hardness H0 of the spherical core is preferably 40 or larger, more preferably 45 or larger, and even more preferably 50 or larger in JIS-C hardness. If the center hardness H0 is smaller than 40 in JIS-C hardness, the core becomes so soft that the resilience of the golf ball tends to become lower. The center hardness H0 of the spherical core is preferably 70 or smaller, more preferably 65 or smaller, and even more preferably 60 or smaller in JIS-C hardness. If the center hardness H0 is more than 70 in JIS-C hardness, the spherical core becomes too hard, resulting in the poor shot feeling.

The hardness H5 at a distance of 5 mm from the central point of the spherical core is preferably 63 or larger, more preferably 65 or larger, and is preferably 73 or less, more preferably 71 or less in JIS-C hardness. The hardness H12.5 at a distance of 12.5 mm from the central point of the spherical core is preferably 64 or larger, more preferably 66 or larger, and is preferably 76 or less, more preferably 72 or less in JIS-C hardness. If the hardness H5 and H12.5 fall within the above range, the spherical core tends to have a desired hardness distribution.

The surface hardness Hs of the spherical core is preferably 78 or larger, more preferably 80 or larger, and even more preferably 82 or larger, and is preferably 100 or less, more preferably 95 or less, even more preferably 90 or less in JIS-C hardness. If the surface hardness Hs is 78 or larger in JIS-C hardness, the spherical core does not become too soft, resulting in the better resilience. If the surface hardness Hs of the spherical core is 100 or less in JIS-C hardness, the spherical core does not become too hard, resulting in the good shot feeling.

The spherical core preferably has a diameter of 34.8 mm or larger, more preferably 36.8 mm or larger, even more preferably 38.8 mm or larger, and preferably has a diameter of 41.8 mm or smaller, more preferably 41.2 mm or smaller, even more preferably 40.8 mm or smaller. If the diameter of the spherical core is 34.8 mm or larger, the cover does not become too thick, resulting in the better resilience. On the other hand, if the diameter of the spherical core is 41.8 mm or less, the cover does not become too thin, resulting in the better function of the cover.

In the case that the spherical core has a diameter of from 34.8 mm to 41.8 mm, the compression deformation amount (shrinking amount along the shrinkage direction) of the core when applying a load from 98 N as an initial load to 1275 N as a final load is preferably 2.0 mm or more, more preferably 2.8 mm or more, and is preferably 6.0 mm or less, and more preferably 4.5 mm or less. If the compression deformation amount is 2.0 mm or more, the shot feeling becomes better, while if the compression deformation amount is 6.0 mm or less, the resilience is getting better.

The cover of the golf ball of the present invention is formed from a cover composition containing a resin component. The resin component includes, for example, an ionomer resin, a thermoplastic polyurethane elastomer having a commercial name of "Elastollan (registered trademark)" available from BASF Japan Co., a thermoplastic polyamide elastomer having a commercial name of "Pebax (registered trademark)" commercially available from Arkema K. K.; a thermoplastic polyester elastomer having a commercial name of "Hytrel (registered trademark)" commercially available from Du Pont-Toray Co., Ltd.; a thermoplastic styrene elastomer having a commercial name of "Rabalon (registered trademark)" commercially available from Mitsubishi Chemical Corporation.

Examples of the ionomer resin include one prepared by neutralizing at least a part of carboxyl groups in a binary copolymer, composed of olefin and an α,β-unsaturated carboxylic acid having 3 to 8 carbon atoms with a metal ion; one prepared by neutralizing at least a part of carboxyl groups in a terpolymer composed of olefin, an α,β-unsaturated carboxylic acid having 3 to 8 carbon atoms, and an α,β-unsaturated carboxylic acid ester with a metal ion; or a mixture of these two. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid include acrylic acid, methacrylic acid, fumaric acid, maleic acid, crotonic acid, or the like. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Among these, as the ionomer resin, preferred is a metal ion-neutralized product of the binary copolymer composed of ethylene-(meth)acrylic acid or a metal ion-neutralized product of the ternary copolymer composed of ethylene-(meth)acrylic acid-(meth)acrylic acid ester. Herein, "(meth)acrylic acid" means acrylic acid and/or methacrylic acid.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg), Himilan AM7329 (Zn); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 6320 (Mg), Surlyn 8120 (Na), Surlyn 8320 (Na), Surlyn 9320 (Zn))" and the ternary copolymerized ionomer such as "HPF 1000 (Mg), HPF 2000 (Mg)" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal types of neutralizing metal ions for the ionomer resins.

In one preferable embodiment, the cover composition constituting the cover of the golf ball of the present invention preferably contains the thermoplastic polyurethane elastomer or the ionomer resin, as the resin component. In the case that the ionomer resin is used, the thermoplastic styrene elastomer is preferably used in combination. The content of the polyurethane or the ionomer resin in the resin component of the cover composition is preferably 50 mass % or more, more preferably 60 mass % or more, even more preferably 70 mass % or more.

In the present invention, in addition to the aforementioned resin component, the cover composition may further contain a pigment component such as a white pigment (for example, titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 parts by mass or more, it is possible to impart the opacity to the cover. If the amount of the white pigment is more than 10 parts by mass, the durability of the resultant cover may deteriorate.

The cover composition preferably has a slab hardness of 66 or less, more preferably 64 or less, even more preferably 62 or less in Shore D hardness. If the cover composition has a slab hardness of 66 or less, the spin rate on the approach shots with short irons increases. As a result, the golf ball having a good controllability on the approach shots is obtained. In order to impart the abrasion resistance, the cover composition preferably has a slab hardness of 55 or more, more preferably 57 or more, even more preferably 59 or more in Shore D hardness. In the case of the multi-layered cover, the slab hardness of the cover compositions constituting the respective layers may be same or different one another, as long as the slab hardness thereof fall within the above range.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition onto the core, the cover composition in the pellet form obtained by extrusion may be used for injection molding, or the cover materials such as the base resin component, the pigment and the like may be dry blended, followed by directly injection molding. It is preferred to use upper and lower molds for forming a cover having a spherical cavity and pimples, wherein a part of the pimples also serves as a retractable hold pin. When forming the cover by injection molding, the hold pin is protruded to hold the core, and the cover composition is charged and then cooled to obtain a cover. For example, the cover composition heated at the temperature of 200° C. to 250° C. is charged into a mold held under the pressure of 9 MPa to 15 MPa for 0.5 to 5 second. After cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the thickness of the cover of the golf ball is preferably 4.0 mm or less, more preferably 3.0 mm or less, even more preferably 2.0 mm or less. If the thickness of the cover is 4.0 mm or less, the resilience and shot feeling of the obtained golf ball become better. The thickness of the cover is preferably 0.5 mm or more, more preferably 0.8 mm or more, and even more preferably 1.0 mm or more. If the thickness of the cover is less than 0.5 mm, the durability and the abrasion resistance of the cover may deteriorate. In the case of the multi-layered cover, it is preferable that a total thickness of the multi-layered cover falls within the above range.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

When the golf ball of the present invention has a diameter in a range from 40 mm to 45 mm, a compression deformation amount of the golf ball (an amount of compression of the golf ball in the compression direction thereof) when applying an initial load of 98 N to a final load of 1275 N to the golf ball is preferably 2.5 mm or more, more preferably 2.7 mm or more, even more preferably 2.8 mm or more, and is preferably 4.0 mm or less, more preferably 3.8 mm or less, even more preferably 3.6 mm or less. If the compression deformation amount is 2.5 mm or more, the golf ball does not become excessively hard, and thus exhibits the good shot feeling. On the other hand, if the compression deformation amount is 4.0 mm or less, the resilience is enhanced.

The golf ball construction is not limited, as long as it comprises a spherical core and at least one cover layer covering the spherical core. The spherical core preferably has a single-layered structure. The spherical core having the single-layered structure has an enhanced resilience, because there is no loss of hitting energy at the interfaces of the multi-layered structure. The cover may be composed of at least one layer, and may have a single-layered structure or a multi-layered structure with at least two layers. Examples of the golf ball of the present invention are a two-piece golf ball comprising a spherical core and a single-layered cover disposed around the spherical core, and a multi-piece golf ball comprising a spherical core and at least two-layered cover disposed around the spherical core (including the three-piece golf ball), and a wound golf ball comprising a spherical core, a rubber thread layer formed around the spherical core, and a cover disposed around the rubber thread layer. The present invention can be applied to any one of the golf balls having the above constructions.

EXAMPLES

Hereinafter, the present invention will be described in detail by way of example. The present invention is not limited to examples described below. Various changes and modifications can be made without departing from the spirit and scope of the present invention.

[Evaluation]
(1) Hardness Distribution of Spherical Core (JIS-C Hardness)
A type P1 auto loading durometer manufactured by Kobunshi Keiki Co., Ltd., provided with a JIS-C type spring hardness tester was used to measure the hardness of the spherical core. The hardness measured at the surface of the spherical core was adopted as the surface hardness Hs of the spherical core. The spherical core was cut into two hemispheres to obtain a cut plane, and the hardness H0, H5 and H12.5 were measured at the central point, at a distance of 5 mm from the central point, at a distance of 12.5 mm from the central point of the cut plane, respectively.
(2) Slab Hardness (Shore D Hardness)
Sheets with a thickness of about 2 mm were produced by heat-pressing the cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.
(3) Compression Deformation Amount (mm)
A compression deformation amount of the spherical core and golf ball (a shrinking amount of the spherical core and golf ball in the compression direction thereof), when applying a load from 98 N as an initial load to 1275 N as a final load to the spherical core and golf ball, was measured.
(4) Initial Ball Speed (m/s) and Flight Distance (m)
A titanium-head W#1 driver ("XXIO" manufactured by SRI Sports Limited, Shaft hardness: S, loft angle: 10.0°) was installed on a swing robot M/C manufactured by TRUETEMPER CO. Golf balls were hit at a head speed of 45 m/sec, and the initial speeds of the golf balls right after hitting and the flight distances (the distance from the launch point to the stop point) were measured. This measurement was conducted ten times for each golf ball, and the average values were adopted as the initial speed and the flight distance of the golf ball.
(5) Durability
A metal-head W#1 driver ("XXIO" manufactured by SRI sports, Shaft hardness: S, loft angle: 10.0°) was installed on a swing robot manufactured by TRUETEMPER CO, and the head speed was set to 45 m/sec. Each golf ball was stored in a constant temperature reservoir kept at the temperature of 23° C. for 12 hours. Immediately after taking each golf ball out of the reservoir, they were repeatedly hit with the driver. The number of hits required to break the golf ball was counted. This measurement was conducted by using twelve golf balls for each golf ball. The number of hits for golf ball No. 9 was defined as an index of 100, and the durability of each golf ball was represented by converting the number of hits for each golf ball into this index. A greater index value indicates that the durability of the golf ball is excellent.
[Synthesis of Polynuclear Aromatic Organic Sulfur Compound]
(1) Synthesis of Anthracene Thiol
The reaction of anthracene (Tokyo chemical industry Co., Ltd) with sulfur trioxide (Tokyo chemical industry Co., Ltd) was conducted in the presence of the piperidine catalyst to synthesize β-anthracenesulfonic acid, followed by a treatment with a sodium hydroxide solution to obtain anthracenesulfonic acid sodium. The obtained anthracenesulfonic acid sodium was allowed to react with phosphorous trichloride and phosphorous pentachloride (Tokyo chemical industry Co., Ltd) in a solvent of phosphorous dichloride (Tokyo chemical industry Co., Ltd) at the temperature of 120° C., thereby obtaining anthracenesulfonyl chloride. In THF, anthracenesulfonyl chloride was allowed to react with lithium aluminum hydride, followed by a treatment with hydrochloric acid to yield anthracene thiol.
(2) Synthesis of Naphthalene Thiol
A sodium hydroxide solution was added to naphthalene thiol, heated to 90° C. to 95° C. and stirred for 30 min. Then, a zinc chloride solution was added, heated and stirred for 30 min. The product was rinsed in water, and toluene to obtain a zinc salt.
[Production of Spherical Cores]
(1) Preparation of the Center
The core rubber compositions having formulations shown in Table 1 were kneaded and heat-pressed in upper and lower molds, each having a hemispherical cavity to obtain the spherical cores. Heating conditions were shown in Table 3 and 4.

TABLE 1

| | Core rubber composition No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13A | 13B | 14 | 15 |
| Polybutadiene rubber | 100 | 100 | 100 | 100 | 100 | 100 | 100 | 100 | 100 | 100 | 100 | 100 | 100 | 100 | 100 | 100 |
| Zinc acrylate | 28 | 38 | 26 | 44 | 25 | 29 | 26 | 28 | 29 | 31 | 26.5 | 29.5 | 22.5 | 34 | 40 | 28 |
| Zinc oxide | 5 | 5 | 5 | 5 | 5 | 5 | 5 | 5 | 5 | 5 | 5 | 5 | 5 | 5 | 5 | 5 |
| Barium sulfate | 16.1 | 12.2 | 16.8 | 9.8 | 17.3 | 15.7 | 16.8 | 16.1 | 15.7 | 14.9 | 15.9 | 14.3 | 18.3 | 13.8 | 10.5 | 16.1 |
| 2-naphthalene thiol | 0.2 | 2.0 | 0.08 | 3.5 | 0.03 | — | — | — | — | — | — | 3.5 | — | — | — | — |
| Zinc salt of 2-naphthalene thiol | — | — | — | — | — | — | 0.48 | — | — | — | — | — | — | — | — | — |
| 1-naphthalene thiol | — | — | — | — | — | 0.2 | — | — | — | — | — | — | — | — | — | — |
| Anthracene thiol | — | — | — | — | — | — | — | 0.26 | — | — | — | — | — | — | — | — |
| Diphenyl disulfide | — | — | — | — | — | — | — | — | 0.5 | — | — | — | 0.5 | 0.5 | — | — |
| Bis(pentabromopheny)disulfide | — | — | — | — | — | — | — | — | — | — | 0.5 | — | — | — | — | — |
| Pentachlorothiophenol | — | — | — | — | — | — | — | — | — | 0.6 | — | — | — | — | — | — |
| Dicumyl peroxide | 0.9 | 0.9 | 0.9 | 0.9 | 0.9 | 0.9 | 0.9 | 0.9 | 0.9 | 0.9 | 0.9 | 0.9 | 0.9 | 0.9 | — | 1.5 |
| Perhexa C-40 | — | — | — | — | — | — | — | — | — | — | — | — | — | — | 3.0 | — |
| Nocrac NS-6 | — | — | — | — | — | — | — | — | — | — | — | — | — | — | 0.1 | 0.5 |
| Zinc stearate | — | — | — | — | — | — | — | — | — | — | — | — | — | — | 5.0 | — |
| Sulfur | — | — | — | — | — | — | — | — | — | — | — | — | — | — | 0.1 | — |
| Zinc salt of Pentachlorothiophenol | — | — | — | — | — | — | — | — | — | — | — | — | — | — | 0.5 | — |

Formulation: parts by mass
Polybutadiene rubber: "BR-730 (high-cis polybutadiene)" manufactured by JSR Corporation
Zinc acrylate: "Sanceler SR" manufactured by Sanshin Chemical Industry Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
2-naphthalenethiol: Tokyo chemical industry Co., Ltd.
1-naphthalenethiol: Alfa Aesar.
Diphenyl disulfide: Sumitomo Seika Chemicals Co., Ltd.
Bis(pentabromophenyl)disulfide: Sankyo Kasei Co., Ltd.
Pentachlorothiophenol: Tokyo chemical industry Co., Ltd.
Dicumyl peroxide: "Percumyl (registered trademark) D" manufactured by NOF Corporation.
Perhexa C-40: 1,1-di(t-butylperoxy)cyclohexane manufactured by NOF Corporation.
Nocrac NS-6: 2,2'-methylenebis(4-methyl-6-t-butylphenol) manufactured by Ouchi Shinko Chemical Industry Co., Ltd.
Zinc stearate: NOF Corporation.
Sulfur: "Sulfur Z" manufactured by Tsurumi Chemical Industry Co., Ltd.
Zinc salt of Pentachlorothiophenol: Tokyo chemical industry Co., Ltd.

(2) Preparation of Cover Composition

Blending materials shown in Table 2 were mixed with a twin-screw kneading extruder to prepare the cover composition in the pellet form. The extruding conditions of the cover composition were a screw diameter of 45 mm, a screw rotational speed of 200 rpm, and screw L/D=35, and the mixtures were heated to 160 to 230° C. at the die position of the extruder.

TABLE 2

| Cover composition | Parts by mass |
|---|---|
| Surlyn 8945 | 49 |
| Himilan AM7329 | 48 |
| Rabalon T3221C | 3 |
| Titanium oxide | 3 |
| Ultramarine blue | 0.04 |
| Cover thickness (mm) | 1.6 |
| Slab hardness (Shore D) | 62 |

Note on Table 2:
SURLYN 8945: Sodium ion neutralized ethylene-methacrylic acid copolymer ionomer resin available from E.I. du Pont de Nemours and Company.
Himilan AM7329: Zinc ion neutralized ethylene-methacrylic acid copolymer ionomer resin available from Du Pont-Mitsui Polychemicals Co., Ltd
Rabalon T3221C: Polystyrene elastomer available from Mitsubishi Chemical Corporation.

(3) Production of Golf Ball Body

The cover composition obtained above was injection-molded onto the spherical cores to form the golf balls with the cover (thickness: 1.6 mm). Upper and lower molds for the cover have a spherical cavity with pimples, a part of which serves as a hold pin which is extendable and retractable. When molding the cover, the hold pins were protruded to hold the core after the core was put in, the cover composition heated to 260° C. was charged into the mold under a pressure of 80 tons within 0.3 seconds, and cooled for 30 seconds. Then, the mold was opened, and the golf ball bodies were taken out from the mold. The surface of the obtained golf ball bodies were treated with sandblast, marked, and painted with a clear paint. The paint was dried in an oven at 40° C. to form a paint film, and golf balls having a diameter of 42.8 mm and a mass of 45.4 g were obtained. The results of evaluations of the golf balls were shown in tables 3 and 4.

TABLE 3

|  |  | Golf ball No. | | | | | | | |
|---|---|---|---|---|---|---|---|---|---|
|  |  | 1 | 2 | 3 | 4 | 5 | 6 | 7 | 8 |
| Core construction | | Single Layer | | | | | | | |
| Core rubber composition | | 1 | 2 | 3 | 4 | 5 | 6 | 7 | 8 |
| Heating Condition | Temp (° C.) | 170 | 170 | 170 | 170 | 170 | 170 | 170 | 170 |
|  | Time (min.) | 25 | 25 | 25 | 25 | 25 | 25 | 25 | 25 |
| Hardness | Diameter (mm) | 39.6 | 39.6 | 39.6 | 39.6 | 39.6 | 39.6 | 39.6 | 39.6 |
| Distribution | Central Point | 57.0 | 56.0 | 59.0 | 55.0 | 60.0 | 57.5 | 57.0 | 57.0 |
| (JIS-C | 2.5 mm | 64.0 | 63.5 | 64.5 | 63.0 | 65.0 | 64.0 | 64.0 | 63.5 |
| Hardness) | 5 mm | 68.0 | 68.0 | 68.0 | 68.0 | 68.0 | 68.0 | 68.0 | 68.0 |
|  | 7.5 mm | 68.5 | 68.5 | 68.5 | 68.5 | 68.0 | 68.0 | 68.0 | 68.0 |
|  | 10 mm | 68.5 | 68.5 | 68.5 | 68.5 | 68.5 | 68.5 | 68.5 | 68.5 |
|  | 12.5 mm | 69.0 | 69.0 | 69.0 | 69.5 | 69.0 | 69.0 | 69.0 | 69.0 |
|  | 15 mm | 74.0 | 74.5 | 73.0 | 75.0 | 72.0 | 74.0 | 74.0 | 74.0 |
|  | Surface | 84.0 | 84.5 | 83.0 | 85.0 | 82.0 | 84.0 | 83.5 | 83.0 |
|  | Hardness difference A | 11.0 | 12.0 | 9.0 | 13.0 | 8.0 | 10.5 | 11.0 | 11.0 |
|  | Hardness difference B | 1.0 | 1.0 | 1.0 | 1.5 | 1.0 | 1.0 | 1.0 | 1.0 |
|  | Hardness difference C | 15.0 | 15.5 | 14.0 | 15.5 | 13.0 | 15.0 | 14.5 | 14.0 |
|  | Hardness difference D | 27.0 | 28.5 | 24.0 | 30.0 | 22.0 | 26.5 | 26.5 | 26.0 |
| Ball Properties | Compression deformation amount (mm) | 3.2 | 3.2 | 3.2 | 3.2 | 3.2 | 3.2 | 3.2 | 3.2 |
|  | Initial ball Speed (m/s) | 64.8 | 64.6 | 64.7 | 64.5 | 64.7 | 64.5 | 64.5 | 64.6 |
|  | Flight distance (m) | 233 | 232 | 231 | 231 | 230 | 231 | 231 | 231 |
|  | Durability | 98 | 97 | 99 | 95 | 99 | 97 | 96 | 98 |

TABLE 4

|  |  | Golf ball No. | | | | | | |
|---|---|---|---|---|---|---|---|---|
|  |  | 9 | 10 | 11 | 12 | 13 | 14 | 15 |
| Core construction | | Single Layer | | | | Inner Layer / Outer Layer | Single Layer | |
| Core rubber composition | | 9 | 10 | 11 | 12 | 13A / 13B | 14 | 15 |
| Heating Condition | Temp(° C.) | 170 | 170 | 170 | 155 | 170 / 170 | 160 | 162 |
|  | Time (min.) | 25 | 25 | 25 | 40 | 25 / 25 | 25 | 23 |
| Hardness | Diameter (mm) | 39.6 | 39.6 | 39.6 | 39.6 | 25.0 / 39.6 | 39.6 | 39.6 |
| Distribution | Central Point | 64.0 | 64.0 | 62.0 | 72.0 | 54.0 | 57.0 | 65.0 |
| (JIS-C | 2.5 mm | 68.0 | 67.5 | 66.5 | 72.5 | 58.0 | 63.0 | 69.0 |
| hardness) | 5 mm | 68.5 | 68.5 | 69.0 | 73.0 | 59.0 | 68.0 | 72.0 |
|  | 7.5 mm | 69.0 | 69.0 | 70.5 | 73.0 | 61.0 | 68.5 | 72.0 |
|  | 10 mm | 69.5 | 69.0 | 70.5 | 73.5 | 65.0 | 69.0 | 72.0 |
|  | 12.5 mm | 71.0 | 71.0 | 71.0 | 73.5 | 69.0 | 67.0 | 75.0 |
|  | <15 mm | 74.0 | 73.5 | 75.0 | 74.0 | 80.0 | 65.0 | 77.0 |
|  | Surface | 80.0 | 80.0 | 83.0 | 74.0 | 85.0 | 84.0 | 78.0 |
|  | Hardness difference A | 4.5 | 4.5 | 7.0 | 1.0 | 5.0 | 11.0 | 7.0 |
|  | Hardness difference B | 2.5 | 2.5 | 2.0 | 0.5 | 10.0 | −1.0 | 3.0 |
|  | Hardness difference C | 9.0 | 9.0 | 12.0 | 0.5 | 16.0 | 17.0 | 3.0 |
|  | Hardness difference D | 16.0 | 16.0 | 21.0 | 2.0 | 31.0 | 27.0 | 13.0 |
| Ball Properties | Compression deformation amount (mm) | 3.2 | 3.2 | 3.2 | 3.2 | 3.2 | 3.2 | 3.2 |
|  | Initial ball Speed (m/s) | 64.5 | 64.5 | 64.8 | 65 | 64.3 | 64 | 64 |
|  | Flight distance (m) | 225 | 224 | 228 | 223 | 230 | 220 | 219 |
|  | Durability | 100 | 100 | 100 | 120 | 60 | 95 | 105 |

The results of Tables 3 and 4 indicated that the golf balls No. 1 to No. 8 of the present invention showed a great flight distance. These result are attributed to the facts that the spherical cores used for the golf balls have a high resilience and a desired outer-hard and inner-soft structure and that the golf balls with a high launch angle and a low spin rate are obtained. Golf balls No. 9 and No. 10 are the cases that diphenyl disulfide and pentachlorothiophenol were used as the organic sulfur compound respectively. Since the initial golf ball speed was low, the flight distance became short. Golf balls No. 11 and No. 12 showed a lowered flight distance, since the cores did not have a desired hardness distribution, irrespective of a high initial golf ball speed. Golf ball No. 13 is the case that two layered-core was adopted. The durability was lowered. Golf balls No. 14 and No. 15 showed a lowered flight distance, because the cores thereof did not have a desired hardness distribution.

According to the present invention, the golf balls traveling a great distance were obtained. This application is based on Japanese Patent application No. 2010-157812 filed on Jul. 12, 2010, the contents of which are hereby incorporated by reference.

The invention claimed is:
1. A golf ball comprising:
a spherical core, and
at least one cover layer covering the spherical core,
wherein the spherical core is formed from a rubber composition containing a base rubber, a co-crosslinking agent, a crosslinking initiator, a filler and 2-naphthalene thiol or a metal salt thereof, the spherical core has a hardness distribution that satisfies B<A≤C, and JIS-C hardness does not decrease in a direction from the spherical core central point toward the spherical core surface, wherein A=(Hardness H5 at a distance of 5 mm from the central point of the spherical core)−(Central hardness H0 at the central point of the spherical core);

B=(Hardness H12.5 at a distance of 12.5 mm from the central point of the spherical core)−(Hardness H5 at a distance of 5 mm from the central point of the spherical core);

C=(Surface hardness Hs at the surface of the spherical core)−(Hardness H12.5 at a distance of 12.5 mm from the central point of the spherical core); and B ranges from 0 to 4 in JIS-C hardness.

2. The golf ball according to claim 1, wherein the rubber composition contains 2-naphthalene thiol or a metal salt thereof in an amount of 0.03 part to 3.5 parts by mass with respect to 100 parts by mass of the base rubber.

3. The golf ball according to claim 1, wherein a hardness difference D between the surface hardness Hs and the central hardness H0 at the central point of the spherical core is 22 or more in JIS-C hardness.

4. The golf ball according to claim 1, wherein A ranges from 6 to 15 in JIS-C hardness.

5. The golf ball according to claim 1, wherein C ranges from 10 to 20 in JIS-C hardness.

6. The golf ball according to claim 1, wherein the central hardness H0 ranges from 40 to 70 in JIS-C hardness.

7. The golf ball according to claim 1, wherein the hardness H5 ranges from 63 to 73 in JIS-C hardness.

8. The golf ball according to claim 1, wherein the hardness 1112.5 ranges from 64 to 76 in JIS-C hardness.

9. The golf ball according to claim 1, wherein the surface hardness Hs ranges from 78 to 100 in JIS-C hardness.

10. A golf ball comprising:
a spherical core, and
at least one cover layer covering the spherical core,
wherein the spherical core is formed from a rubber composition containing a base rubber, a co-crosslinking agent, a crosslinking initiator, a filler and 2-naphthalene thiol or a metal salt thereof, and the spherical core has a hardness distribution that satisfies B<A≤C, and JIS-C hardness does not decrease in a direction from the spherical core central point toward the spherical core surface,
wherein A=(Hardness H5 at a distance of 5 mm from the central point of the spherical core)−(Central hardness H0 at the central point of the spherical core);

B=(Hardness H12.5 at a distance of 12.5 mm from the central point of the spherical core)−(Hardness H5 at a distance of 5 mm from the central point of the spherical core);

C=(Surface hardness Hs at the surface of the spherical core)−(Hardness H12.5 at a distance of 12.5 mm from the central point of the spherical core); and B ranges from 0 to 4 in JIS-C hardness.

11. The golf ball according to claim 10, wherein a hardness difference D between the surface hardness Hs and the central hardness H0 at the central point of the spherical core ranges from 22 to 35 in JIS-C hardness.

12. The golf ball according to claim 1, wherein a hardness difference D between the surface hardness Hs and the central hardness H0 at the central point of the spherical core ranges from 22 to 35 in JIS-C hardness.

13. The golf ball according to claim 1, wherein B ranges from 0.5 to 3 in JIS-C hardness.

14. The golf ball according to claim 10, wherein B ranges from 0.5 to 3 in JIS-C hardness.

* * * * *